United States Patent Office 3,564,009
Patented Feb. 16, 1971

3,564,009
PROCESS FOR PRODUCING 1-ACYLINDOLE DERIVATIVES
Hisao Yamamoto, Nishinomiya-shi, Masaru Nakao, Osaka, and Toshio Atsumi, Takarazuka-shi, Japan, assignors to Sumitomo Chemical Company, Ltd., Osaka, Japan, a corporation of Japan
No Drawing. Filed Dec. 28, 1966, Ser. No. 605,171
Claims priority, application Japan, Jan. 13, 1966, 41/1,916; Mar. 15, 1966, 41/16,237; Apr. 5, 1966, 41/21,646; Apr. 7, 1966, 41/22,178; July 14, 1966, 41/46,335
Int. Cl. C07d 27/56
U.S. Cl. 260—326.16  8 Claims

ABSTRACT OF THE DISCLOSURE

A process for the preparation of certain N-acylindoles by the reaction of an N'-acylhydrazine with a ketone compound.

---

This invention relates to a process for producing N-acylindole derivatives represented by the general formula:

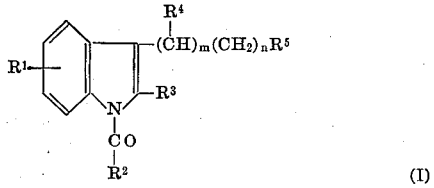

wherein $R^1$ represents a lower alkyl having up to 4 carbon atoms, alkoxy having up to 3 carbon atoms, alkylthio group having up to 3 carbon atoms or a halogen atom or a hydrogen atom; $R^2$ represents unsubstituted or halogen-, phenyl- or phenoxy-substituted, saturated or unsaturated hydrocarbon chain having 6 or less carbon atoms, unsubstituted or halogen-substituted heterocyclic five-membered ring or heterocyclic six-membered ring containing nitrogen, oxygen or sulfur atom, and unsubstituted or lower alkyl-, alkoxy-, alkylthio-, halogen-substituted aromatic ring; $R^3$ represents a hydrogen atom, lower alkyl group or unsubstituted or alkoxy-, alkylthio-, alkyl-, hydroxy- or halogen-substituted phenyl group; $R^4$ represents a hydrogen atom or lower alkyl group having up to 2 carbon atoms; $R^5$ represents a hydrogen atom, hydroxy group, unsubstituted or halogen-, alkyl- or alkoxy substituted phenyl group or nitro group, or a group represented by the general formula:

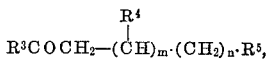

wherein $R^6$ and $R^7$ represent hydrogen atoms, lower alkyl groups having up to 3 carbon atoms, phenyl groups and groups forming a ring together with a nitrogen atom; $m$ represents 0 or 1; and $n$ represents 0 or an integer of 1–3.

Most of N-acylindole compounds of the present invention are novel compounds. Many of them have anti-inflammatory, analgesic, antipyretic, and sedative activities, and therefore they are quite useful. An object of the present invention is to produce these useful compounds advantageously from a commercial point of view.

That is, when $N_1$-acylphenylhydrazine derivative represented by the general formula:

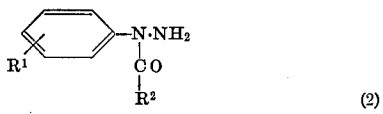

wherein $R^1$ and $R^2$ are same as identified above, respectively, but $R^1$ is substituted at meta- or para-position of hydrazino group in this case, or a salt thereof is subjected to thermal reaction with a ketone compound or salt thereof represented by the general formula:

$$R^3COCH_2-(\overset{R^4}{\underset{|}{C}H})_m\cdot(CH_2)_n\cdot R^5,$$

wherein $R^3$, $R^4$, $R^5$, $m$ and $n$ are same as identified above in a solvent in the presence or absence of a suitable condensing agent, N-acylindole derivatives represented by the Formula I are obtained.

In the present reaction, progress of the reaction is observed even in the absence of a solvent, but it is desirable to use a suitable solvent. For example, organic acids such as acetic acid, non-polar solvents such as cyclohexane, alcohols such as ethanol and the like may be employed.

In the case when the reaction product becomes a salt by an acid, the condensing agent is not always essential, but except the above case the condensing agent is often used. Inorganic acids such as hydrochloric acid, metal halides such as zinc chloride, boron fluoride, polyphosphoric acid and the like are used. The reaction generally progresses at a temperature ranging from 50° to 180° C., but preferably from 65° to 95° C. The reaction is completed in several hours, in general.

After completion of the reaction, the objective material is directly obtained as precipitate in many cases, but if the objective material is not precipitated, precipitate may be formed by condensing the solvent or adding a solution of acetic acid-water, petroleum ether, ether and the like.

Moreover, concrete examples of the above-mentiond reaction solvents, reaction temperature, condensing agents are respectively given as illustrative and they are not limited thereto at all.

The process of the present invention is quite rich in novelty, and further the starting $N_1$-acylphenylhydrazine derivative is a novel compound which has not been described in any literature.

The present invention process of synthesizing N-acyl group-substituted indole derivatives by Fisher's indole closing reaction from asymmetric hydrazine derivatives substituted by acyl group at $N^1$-position is quite novel. Neither such literature as, for example, "Heterocyclic Compounds" by Elderfield, vol. 3 (1952), chapter 1, pp. 1–274; "Heterocyclic Compounds with Indole and Carbazole Systems" by W. C. Sumpter and F. M. Miller (1954), pp. 1–69, nor newly-published home and foreign literature report or disclose at all the synthesis of N-acyl group-substituted indole derivatives.

Conventional processes are troublesome processes with quite low yield, which comprises first synthesizing indole derivatives, converting the indole derivatives into Na salts, and then acylating the resulting Na salts.

Heretofore, many of Fisher's indole-closing reactions have been carried out under considerably severe conditions, and therefore when the starting hydrazine is first acylated, the resulting material is decomposed during the reaction. Accordingly, none has tried to do it. Therefore, the present inventors are those who tried a process of direct synthesis of N-acyl group-substituted indole derivatives for the first time.

The process of the present invention results in quite good yield in respect to synthesis of N-acylindole derivatives. Moreover it is quite advantageous on a laboratory scale as well as an industrial scale, because it does not require such a complicated process as is seen in conventional method.

As the indole derivatives easily produced according to the process of the present invention, there may concretely be mentioned those, having as $R^1$, besides a hydrogen atom, such as methoxy, ethoxy, methyl, ethyl, n-propyl, isopropyl, methyl mercapto, ethyl-mercapto, chlorine, bromine and fluorine; as $R^2$, such as methyl, ethyl, isopropyl, n-propyl, n-butyl, n-pentyl, chloromethyl, 2-chloroethyl, 2,3-dichloro-n-propyl, vinyl, allyl, 1,3-pentadienyl, phenyl, p-chlorophenyl, p-methoxyphenyl, p-bromophenyl, p-fluorophenyl, p-hydroxyphenyl, p-tolyl, 2-thienyl, 2-furyl, 2-thiazolyl, 5-chloro-2-thienyl, 3-pyridyl, 4-pyridyl, cinnamyl, phenoxyacetyl, N-methyl-hexahydro-3-pyridyl, p-chlorocinnamyl, p-methylcinnamyl and β-3-pyridyl vinyl; as $R^3$, such as a hydrogen atom, methyl, ethyl, propyl, phenyl, p-chlorophenyl, p-tolyl, p-methoxyphenyl, p-hydroxyphenyl, m-tolyl, p-methylthiophenyl, m-chlorophenyl, m-methoxyphenyl, m-hydroxyphenyl and m-methylthiophenyl; as $R^4$, such as a hydrogen atom, methyl, ethyl and propyl; as $R^5$, such as a hydrogen atom, p-chlorophenyl, p-methylphenyl, p-methoxyphenyl, methyl, hydroxy, methoxy and ethoxy; as $R^6$ and $R^7$, such as a hydrogen atom, methyl, ethyl and phenyl, respectively; as

such as piperidyl and pyrrolidyl.

Among novel 1-acylindole derivatives of the present invention, there are many useful compounds, which indicate excellent anti-inflammatory action but extremely low toxicity. For example, as we can see from pharmacological experimental results, compounds such as 1-(p-chlorobenzoyl)-2-methyl-3-ethyl-5-methoxyindole, 1 - (p-chlorobenzoyl)-3-ethyl-5-methoxy - indole, 1 - (p - chlorobenzoyl)-2-methyl-3-benzyl-indole, 1-(p-chlorobenzoyl)-3-methyl-5-methoxy-indole, 1 - (p-chlorobenzoyl)-2,3-dimethyl-5-methoxyindole, etc. show extremely low toxicity in spite of their potential anti-inflammatory action, and hence their therapeutic ratio is exceedingly great in comparison with other first class anti-inflammatory drugs.

| Compound | Dose (per os) mg./kg., mg. | Activity* | 50% lethal dose** (per os) mg./kg. | Therapeutic ratio*** |
|---|---|---|---|---|
| 1-(p-chloro-benzoyl)-2-methyl-3-ethyl-5-methoxy-indole | 100 | ++ | >1,500 | >15 |
| 1-(p-chloro-benzoyl)-3-ethyl-5-methoxy-indole | 100 | ++ | >1,500 | >15 |
| 1-(p-chloro-benzoyl)-2-methyl-3-benzyl-indole | 50<br>150 | +<br>++ | }>1,500 | >10 |
| 1-(p-chloro-benzoyl)-3-methyl-5-methoxy-indole | 100 | ++ | >1,500 | >15 |
| 1-(p-chloro-benzoyl)-2,3-dimethyl-5-methoxy-indole | 100 | ++ | >1,500 | >15 |
| Phenyl-butazone | 40<br>100 | +<br>++ | } 780 | 7.8 |
| Indomethacin | 2.5 | ++ | 25 | 10 |

*Inhibitory action of carrageenin edema of rat hind paw.
**50% lethal dose for one week after oral administration.
***Ratio of 50% lethal dose by dose of ++ activity.

Indomethacin is most effective in non-steroidal anti-inflammatory drugs, which have been developed until now, but its effectiveness involves the high toxicity. The present inventors also observed the appearance of notable occult blood in the feces of rats by oral administration of 100 mg./kg. of indomethacin. Even by oral administration of less than 15 mg./kg. an occult bleeding was observed. Furthermore its delayed toxicity appeared very often and notable bleeding in a intestine of every mouse died was observed.

Further, butazolidin is a representative anti-inflammatory drug and one of the best drugs which are most widely used now, but its effect is rather low in spite of high acute toxicity.

On the other hand, mentioned products of this invention did not develop toxic symptoms in rats even after oral administration of more than 1000 mg./kg. dose and its toxicity was minimum low. In these cases, occult blood test in their feces showed negative. But, the effects of these products are considerably higher than those butazolidin, oxyphenbutazone and the like and therapeutic ratios of these novel products are far greater than those of such first class non steroidal antiinflammatory drugs as those medicines mentioned. Therefore, it goes without saying that these novel products are extremely great valuable in practical field.

The present invention is further explained in detail by referring to the following examples. These examples are illustrative, and the invention is not to be considered as limited thereto.

EXAMPLE 1

9.2 g. of $N_1$-(p-chlorobenzoyl)-$N_1$-(p-methoxyphenyl) hydrazine hydrochloride and 49 g. of benzylacetone were heated at a temperature ranging from 75° to 80° C. for 2.5 hours. After heating, 1.6 g. of the precipitate of ammonium chloride separated was filtered off. The filtrate was stood in a refrigerator to separate crystals. By washing the crystals with petroleum ether to dryness, 9.8 g. of 1-(p-chlorobenzoyl)-2-methyl-3-benzyl-5-methoxy indole was obtained. The melting point of the product was 113–114.5° C. When the product was recrystallized from ethanol, crystals having a melting point of 123–124° C. were obtained.

EXAMPLE 2

9.2 g. of $N_1$-(p-chlorobenzoyl)-$N_1$-(p-methoxyphenyl)-hydrazine hydrochloride and 10.8 g. of methylethylketone were heated at 75° C. for 25 minutes. 1.5 g. of the precipitate of ammonium chloride was filtered off, and then the filtrate was distilled off under a reduced pressure, to obtain 8.3 g. of crude 1-(p-chlorobenzoyl)-2,3-dimethyl-5-methoxyindole. The melting point was 85–86° C. By recrystallizing the crude substance from ethanol, pure crystals having a melting point of 93–94° C. were obtained.

EXAMPLE 3

10 g. of $N_1$-(p-chlorobenzoyl)-$N_1$-(p-methoxyphenyl)-hydrazine hydrochloride were suspended in 150 ml. of dried benzene, and 5 g. of n-butyl aldehyde was dropped therein. After completion of dropping, the temperature was gradually raised, and heating was conducted at 70° C. for 30 minutes. By filtering the precipitate, concentrating the filtrate under a reduced pressure, filtrating the separated precipitate, washing with petroleum ether and drying, 9.0 g. of crude crystals of 1-(p-chlorobenzoyl)-3-ethyl-5-methoxyindole were obtained. When the resulting substance was recrystallized from ethanol, white crystals with a melting point of 110–112° C. were obtained.

EXAMPLE 4

According to the process of Example 3, 1-(p-chlorobenzoyl)-3-methyl-5-methoxyindole was quantitatively obtained from $N_1$ - (p-chlorobenzoyl) - $N_1$ - (p-methoxyphenyl)hydrazine hydrochloride and propionaldehyde. By recrystallizing the resulting substance from ethanol-water, pure crystals having a melting point of 127–128° C. were obtained.

EXAMPLE 5

1 - (p-chlorobenzoyl) - 2-methyl-3-ethyl-5-methoxyindole was almost quantitatively produced from $N_1$-(p-chlorobenzoyl)-$N_1$ - (p-methoxyphenyl)hydrazine hydrochloride and methylpropylketone. When the resulting substance was washed with alcohol, white crystals having a melting point of 86–88° C. were produced.

EXAMPLE 6

5 g. of $N_1$-(2-furoyl)-$N_1$-(p-tolyl)hydrazine hydrochloride and 6 g. of methylethylketone were heated at 76° C. for 4 hours. After completion of the reaction, 50 ml. of water was added, whereby 5 g. of solid substance was obtained. By repeating recrystallization from ethanol, purified 1-(2-furoyl)-2,3,5-trimethyl indole was obtained. The melting point was 67–68° C.

EXAMPLE 7

According to the process of Example 6, a pale yellow oily substance of 1-nicotinoyl-2,3,5-trimethyl-indole was obtained from $N_1$-nicotinoyl-$N_1$-p-tolyl hydrazine hydrochloride and methylethylketone.

EXAMPLE 8

Oily substance of 1-(2'-thenoyl)-2-methyl-5-chloroindole was obtained by refluxing $N_1$-(2-thenoyl)-$N_1$-(p-chlorophenyl)hydrazine hydrochloride and acetone according to the process in Example 6.

EXAMPLE 9

According to the process in Example 3, 1-(p-chlorobenzoyl)-3-phenyl-5-methoxy indole was obtained from $N_1$ - (p-chlorobenzoyl)-$N_1$-(p-methoxyphenyl)hydrazine hydrochloride and phenylacetaldehyde. The melting point was 101–104° C.

EXAMPLE 10

8.0 g. of $N_1$-(p-chlorobenzoyl)-$N_1$-(p-methoxyphenyl) hydrazine was added to 45 g. of benzyl acetone and further added with 3 ml. of concentrated hydrochloric acid. The mixture was heated at 75° C. for 2 hours. Thereafter, the separated precipitate was filtered and the filtrate was cooled at 0° C. for one day, whereby crystals were separated. The crystals were filtered and dried, to yield 9.3 g. of crude crystals of 1-(p-chlorobenzoyl)-2-methyl-3-benzyl-5-methoxyindole. By recrystallizing the crude substances from ethanol, pure crystals having a melting point of 122–124° C. were obtained.

EXAMPLE 11

According to the process of Example 6, oily substance of 1-chloroacetyl-2,3-dimethyl-5-methoxyindole was obtained from $N_1$-chloracetyl-$N_1$-(p-methoxyphenyl)-hydrazine hydrochloride and methylethylketone.

EXAMPLE 12

10 g. of $N_1$-(p-chlorobenzoyl)-$N_1$-(p-methoxyphenyl) hydrazine hydrochloride, 3.2 g. of 4-oxo-pentanol-(1), and 30 ml. of ethanol were heated at 80° C. for 3 hours. The insoluble materials were filtered and the filtrate was concentrated under a reduced pressure. The resulting substances were recrystallized from acetone, to yield 5.0 g. of 2 - [1'-(p-chlorobenzoyl)-2'-methyl-5'-methoxy-3'-indolyl]-ethanol of the formula

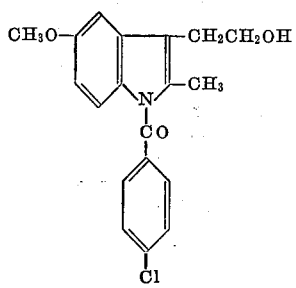

The melting point was 160–160.5° C.

Further, according to the process in Example 12, the following compounds were produced.

EXAMPLE 13

3 - [1' - (p - chlorobenzoyl) - 5' - methoxy - 3' - indolyl] propanol-(1)

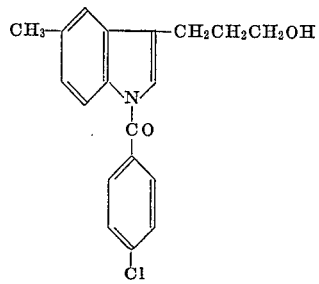

The melting point was 122–124° C.

EXAMPLE 14

1 - nicotinoyl - 2 - methyl-5-methoxy-3-indolylmethanol

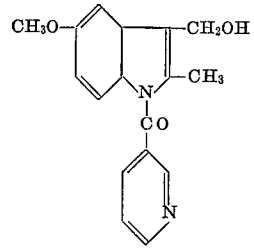

Oily substance.

EXAMPLE 15

10 g. of $N_1$-(p-chlorobenzoyl)-$N_1$-(p-methoxyphenyl) hydrazine hydrochloride and 5.4 g. of p-hydroxyphenyl-ethylketone were added to 20 ml. of glacial acetic acid. The mixture was heated and stirred at 80° C. for 4 hours and 40 minutes. The resulting substance was stood at room temperature overnight. The produced crystals were filtered, washed with water and dried, to yield 12.2 g. of crude 1 - (p-chlorobenzoyl)-2-(p-hydroxyphenyl)-3-methyl-5-methoxyindole having melting point of 167.5–169° C. By recrystallizing the resulting substance from ethanol, 8.2 g. of pure crystals were obtained. The melting point was elevated up to 172–173° C.

EXAMPLE 16

10 g. of $N_1$-(p-chlorobenzoyl)-$N_1$-(p-methoxyphenyl) hydrazine hydrochloride and 7 g. of 4-diethylaminobutane-2-on hydrochloride were added to 35 ml. of ethanol. The mixture was heated at 80° C. for 6 hours with stirring. After standing with cooling, the resulting substance was poured into water and the separated precipitate was washed with an aqueous 5% sodium carbonate solution and then with water sufficiently. The resulting precipitate was dried and purified with acetone water, to yield crystals of 1-(p-chlorobenzoyl) - 2 - methyl - 3 - (diethylamino methyl)-5-methoxyindole of the formula

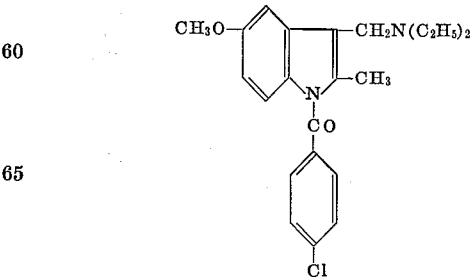

*Elementary analysis.*—Calcd. (percent): N, 7.25; Cl, 9.21. Found (percent): N, 7.13; Cl. 9.38.

EXAMPLE 17

9.5 g. of $N_1$-(p-methylbenzoyl)-$N_1$-(p-methoxyphenyl) hydrazine hydrochloride and 8 g. of 5-anilinopentane-2-on hydrochloride were added to 25 ml. of acetic acid. The mixture was heated at 85° C. with stirring. Thereafter, the resulting mixture was concentrated under a reduced pressure and added to water. The produced precipitate was filtered, well washed with 5% sodium carbonate, to yield the insoluble matter by filtration.

By recrystallizing the resulting substance from acetone-water, 1 - (p-methylbenzoyl) - 2 - methyl-3-(3'-anilinoethyl)-5-methoxyindole of the formula

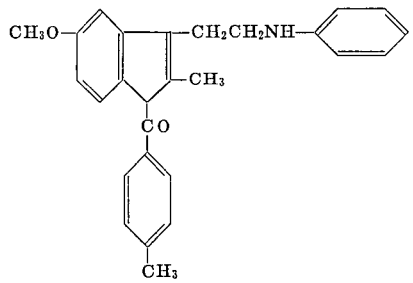

*Elementary analysis.*—Calcd. (percent): N, 9.17; Cl, 11.28. Found (percent): N, 9.38; Cl, 11.39.

EXAMPLE 18

5.5 g. of $N^1$-(p-chlorobenzoyl) - p - methoxyphenylhydrazine hydrochloride and 5.2 g. of p,p'-dimethoxy-deoxybenzoin were added to 50 ml. of acetic acid. The mixture was heated at 80°–90° C., for 6 hours with stirring. The resulting substance was concentrated under a reduced pressure, followed by separating crystals and washing with water. When the crystals were recrystallized from alcohol-water, white crystals of 1-(p-chlorobenzoyl)-2,3-di-(p-methoxyphenyl)-5-methoxyindole. The melting point was 129°–131° C.

EXAMPLE 19

3 g. of $N^1$-(2',4' - hexadienoyl)-p-methoxy-phenylhydrazine hydrochloride was gradually added to 5 g. of propionaldehyde. Thereafter, the mixture was heated on a hot water bath at 80° C. for 1 hour. After standing with cooling, aldehyde was distilled off under a reduced pressure. 20 ml. of benzene was added to the residue. The insoluble matters were removed off by filtration. Petroleum ether was added to the filtrate until it turned to white turbid. Thereafter, the resulting substance was cooled, to yield a large amount of crystals. The crystals were filtered and dried, whereby 2.2 g. of 1-(2',4'-hexadienoyl)3-3-methyl-5-methoxyindole were obtained. The melting point was 162°–163° C.

EXAMPLE 20

2.3 g. of $N^1$-(p-chlorobenzoyl)-phenyl-hydrazine hydrochloride and 1.1 g. of phenylacetone were heated in an acetic acid solvent of 1.1 g. at 70°–75° C. for 3 hours. After completion of the reaction, the resulting substance was poured in water and extracted with benzene. Thereafter, benzene layer was taken out and benzene was distilled off. The residue was recrystallized from ethanol to yield 2.3 g. of 1-p-chlorobenzoyl-2-methyl-3-phenylindole. The melting point was 159°–161° C.

EXAMPLE 21

2 g. of $N^1$-(p-chlorobenzoyl) - phenylhydrazine and 1.1 g. of phenylacetone were heated at 100°–110° C. in polyphosphoric acid for 20 minutes. After completion of the reaction, the reaction liquid was poured in water and extracted with benzene. Benzene layer was taken out and benzene was distilled off. The residue was recrystallized from acetone, to yield 2.2 g. of 1-p-chlorobenzoyl-2-methyl-3-phenylindole. The melting point was 161°–162° C.

EXAMPLE 22

2 g. of $N^1$-(p-chlorobenzoyl)-phenylhydrazine and 1.1 g. of phenylacetone were added with 0.8 mole of $BF_3$, and refluxed at an elevated temperature for 3 hours. After standing for cooling, the separated crystals were taken out, and added in benzene-water. Then the benzene layer was taken out and benzene was distilled off. The residue was recrystallized from acetone, to yield 2.3 g. of 1-p-chlorobenzoyl-2-methyl-3-phenylindole. The melting point was 160.5–161.5° C.

EXAMPLE 23

According to the process in Example 20, 1.7 g. of 1-(p-chlorobenzoyl)-2-methyl-3-ethylindole were obtained from 2.3 g. of $N^1$-(p-chlorobenzoyl)-phenyl-hydrazine hydrochloride and 0.8 g. of methylpropylketone. The melting point was 76.5°–77.5° C.

EXAMPLE 24

According to the process in Example 21, 1.7 g. of 1-(p-chlorobenzoyl)-2-methyl-3-ethylindole were produced from 2.0 g. of $N^1$-(p-chlorobenzoyl)-phenyl-hydrazine and 0.8 g. of methypropylketone. The melting point was 76.5°–78° C.

EXAMPLE 25

2.0 g. of $N^1$-(p-chlorobenzoyl)-phenylhydrazine, 0.8 g. of methylpropylketone and 0.08 mole of zinc chloride were added to an acetic acid solution, and refluxed at an elevated temperature for 4 hours. After standing for cooling, the separated crystals were filtered and added in benzene-water. The benzene layer was removed, and benzene was distilled off. When the residue was recrystallized from acetone, 1.9 g. of 1-(p-chlorobenzoyl)-2-methyl-3-ethylindone were obtained. The melting point was 76.5°–78° C.

EXAMPLE 26

5 g. of $N^1$-(p-chlorobenzoyl)-p-methoxyphenylhydrazine and 4.6 g. of deoxyanisoin were added to 80 ml. of glacial acetic acid. Moreover, 2.6 g. of boron trifluoride-ether-complex was added therein and refluxed at an elevated temperature for 3 hours. After standing with cooling, the precipitate was filtered off and the filtrate was concentrated under a reduced pressure. To the concentrated product water was added and extracted with benzene. The benzene layer was taken out and dried with anhydrous sodium sulfate, and then the benzene was distilled off, to yield 8.5 g. of crude 1-(p-chlorobenzoyl)-2,3-di(p-methoxyphenyl) - 5 - methoxyindole. The crude product was eluted through silica column chromatography (ethylacetate - cyclohexane) and further recrystallized from acetone-ether, whereby purified product having a melting point of 130.5°–131.5° C. was obtained.

According to the process in Example 26, the following compounds were obtained.

EXAMPLE 27

1 - (p-chlorobenzoyl)-2,3-di(p-methoxyphenyl)-indole. The melting point 150°–151.5° C.

EXAMPLE 28

1 - acetyl-2,3-di(p-methoxyphenyl)-indole. The melting point 145°–147° C.

What is claimed is:
1. A process for producing indole derivatives having the formula,

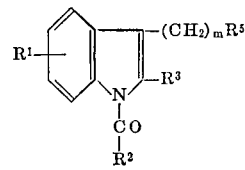

wherein $R^1$ represents $C_1$–$C_2$ alkyl, $C_1$–$C_2$ alkoxy, or hydrogen; $R^2$ represents $C_1$–$C_3$ alkyl or $C_4$–$C_5$ alkadienyl, furyl or pyridyl, or unsubstituted or halogen-substituted phenyl; $R^3$ represents hydrogen, methyl, phenyl, or hydroxyl- or $C_1$–$C_2$ alkoxy-substituted phenyl; $R^5$ represents hydrogen, hydroxyl, phenyl, $C_1$-$C_2$ alkoxy-substituted phenyl or a group represented by the formula:

wherein $R^6$ and $R^7$ represent independently hydrogen, $C_1$-$C_2$ alkyl or phenyl; and $n$ represents 0 or an integer of 1-3, which comprises reacting at an elevated temperature a compound having the formula:

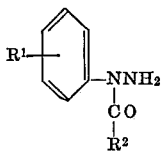

wherein $R^1$ and $R^2$ are the same as identified above, or an acid addition salt thereof with a compound having the formula, $$R^3COCH_2(CH_2)_nR^5$$

wherein $R^3$, $R^5$ and $n$ are identified above, or a salt thereof to yield the indole derivative.

2. A process for producing indole derivatives having the formula,

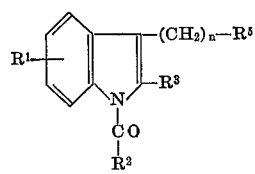

wherein $R^1$ represents hydrogen, methyl or methoxy; $R^2$ represents methyl, chloromethyl, penta-1,3-dienyl, p-chlorophenyl, 3-pyridyl or 2-furyl; $R^3$ represents hydrogen, methyl or methoxyphenyl; $R^5$ is hydrogen phenyl, methoxyphenyl, hydroxyl or a group of the formula,

wherein $R^6$ and $R^7$ represent independently hydrogen, $C_1$-$C_2$ alkyl or phenyl; and $n$ represents 0 or an integer of 1-3, which comprises reacting at an elevated temperature a compound having the formula:

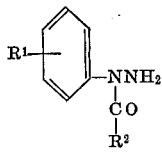

wherein $R^1$ and $R^2$ are the same as identified above, or an acid addition salt thereof with a compound having the formula, $$R^3COCH_2(CH_2)_nR^5$$

wherein $R^3$, $R^5$ and $n$ are identified above, as a salt thereof to yield the indole derivative.

3. A process for producing indole derivatives of the formula,

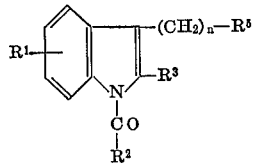

wherein $R^1$ represents hydrogen, methyl or methoxy; $R^2$ represents p-chlorophenyl; $R^3$ represents hydrogen or methyl; $R^5$ represents hydrogen or phenyl; and $n$ is an integer of 1 or 2, which comprises reacting at an elevated temperature a compound having the formula:

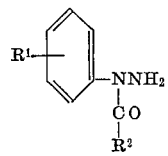

wherein $R^1$ and $R^2$ are the same as identified above, or an acid addition salt thereof with a compound having the formula, $$R^3COCH_2(CH_2)_nR^5$$

wherein $R^3$, $R^5$ and $n$ are identified above, or a salt thereof to yield the indole derivative.

4. A process for producing indole derivative of the formula,

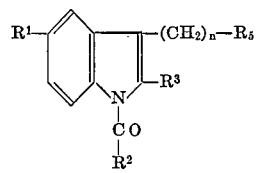

wherein $R^1$ represents hydrogen or methoxy; $R^2$ represents p-chlorophenyl; $R^3$ represents hydrogen or methyl; $R^5$ represents hydrogen or phenyl; and $n$ is an integer of 1 to 2, which comprises reacting at an elevated temperature a compound having the formula,

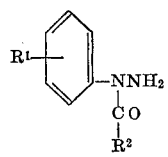

wherein $R^1$ and $R^2$ are the same as identified above, or an acid addition salt thereof with a compound having the formula, $$R^3COCH_2(CH_2)_nR^5$$

wherein $R^3$, $R^5$ and $n$ are identified above, or a salt thereof to yield the indole derivative.

5. A process according to claim 1 for producing indole derivatives selected from the group consisting of 1-(p-chlorobenzoyl)-2-methyl-3-ethyl-5-methoxy indole, 1-(p-chlorobenzoyl)-2-methyl-3-benzyl indole, 1-(p-chlorobenzoyl) - 3 - methyl-5-methoxy indole, and 1-(p-chlorobenzoyl)-2,3-dimethyl-5-methoxy indole.

6. A process according to claim 1 wherein compound II is the acid addition salt thereof.

7. A process according to claim 1 wherein compound II is reacted in the presence of a condensing agent comprising inorganic acids and metal halides.

8. A process according to claim 1 wherein compounds II and III are reacted at a temperature from about 50 to about 180° C.

References Cited

UNITED STATES PATENTS

| | | | |
|---|---|---|---|
| 2,995,566 | 8/1961 | Sletzinger et al. | 260—326.15X |
| 2,995,567 | 8/1961 | Sarett et al. | 260—326.15X |
| 3,014,043 | 12/1961 | Gaines et al. | 260—326.15X |
| 3,285,908 | 11/1966 | Shen | 260—326.14X |

ALEX MAZEL, Primary Examiner

J. A. NARCAVAGE, Assistant Examiner

U.S. Cl. X.R.

260—240, 293.4, 294, 294.8, 295, 326.12, 326.15, 332.2, 558, 999